UNITED STATES PATENT OFFICE.

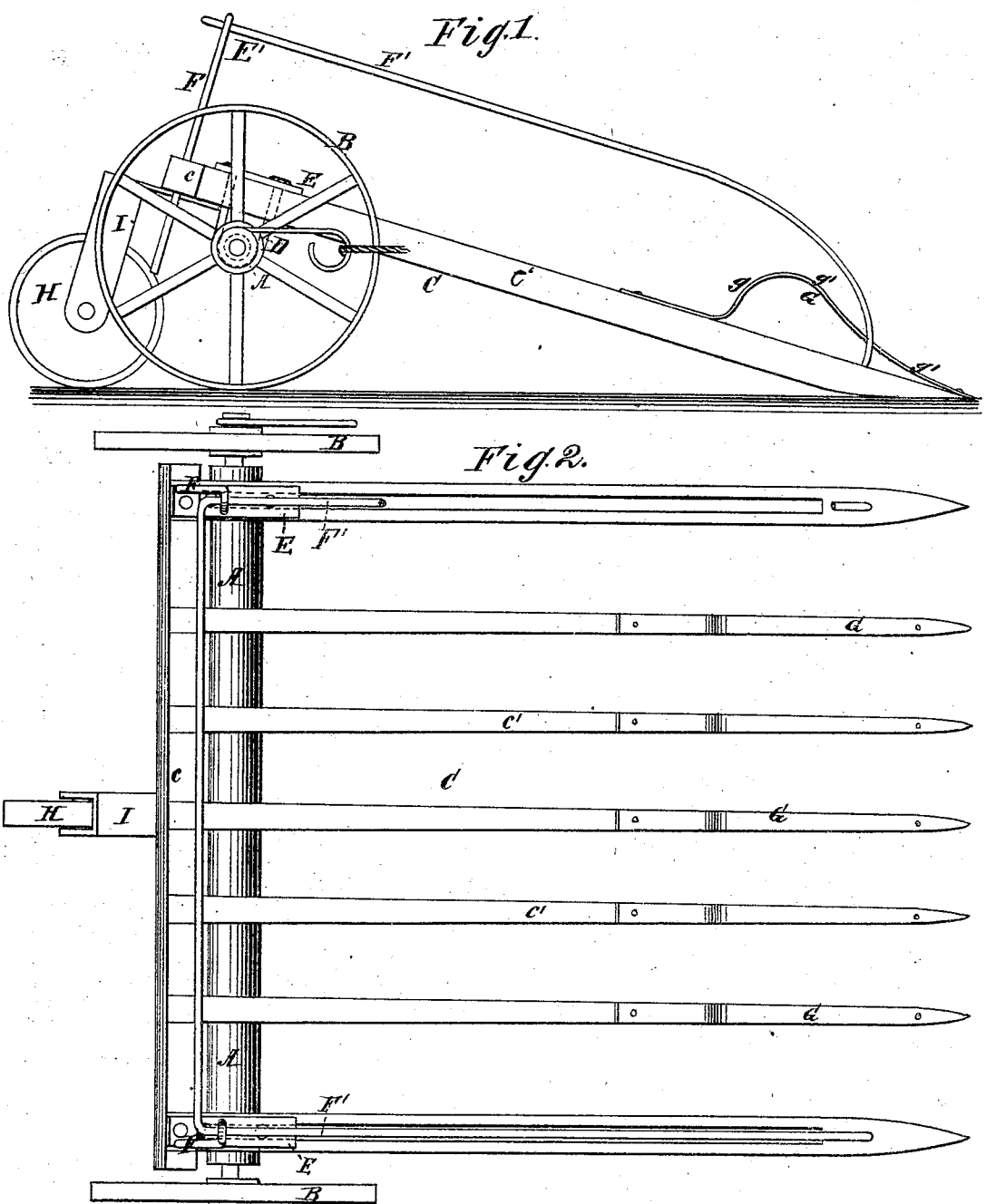

JOHN RUMRILL, OF SALINA, KANSAS.

IMPROVEMENT IN HORSE HAY-RAKES.

Specification forming part of Letters Patent No. 152,174, dated June 16, 1874; application filed January 9, 1874.

*To all whom it may concern:*

Be it known that I, JOHN RUMRILL, of Salina, in the county of Saline and State of Kansas, have invented a new and Improved Hay-Gatherer; and I do hereby declare that the following is a full, clear, and exact description of the same, reference being had to the accompanying drawing forming a part of this specification, in which—

Figure 1 is a side elevation. Fig. 2 is a top view.

The invention relates to means whereby hay, after having been cured in windrow, may be raked and carried to the stack by one continuous operation, thereby greatly lessening the usual labor and the customary waste by hauling it, or by dragging it, with horses and circumjacent ropes or chains.

A represents an axle with wheels B B turning on the journals thereof, and C a rake having head $c$ and teeth $c'$. The side teeth are slotted, and receive therethrough the yokes D D, which are held by plates E E, on the top of which plates their free ends are riveted. These yokes pass around the axle, that is grooved to receive them, or may be prevented from sliding thereon in any other way. E' is a wire, iron, or wooden frame, formed of standards F and rod, wire, or bent wood F'. The ends of the latter are gradually curved toward the front, and fastened to the forward ends of the side teeth of rake. G is a plate fastened near the end of each tooth, except the two side ones, having a sudden rise in the rear, $g$, but a gradual incline on the front, $g'$. The rake-teeth frame E' and plates G combine to hold the hay that has been raked up in its proper place on the combined horse-rake and hay-carrier. H is a third wheel, which may be journaled in a frame, I, that is pivoted to and beneath the middle of the rake-head. The axle being adjustable out toward the ends of the rake-teeth by means of the axle-yokes, (movable in the slots of the side teeth,) the three wheels are made to support the whole structure when the rake is not intended to gather the hay.

Having thus described my invention, what I claim as new, and desire to secure by Letters Patent, is—

1. The combination, with a rake having wheel H journaled in a frame, I, that is pivoted to the rake-head, of the axle carrying the two main wheels, and adjustable under and toward the ends of the teeth, as and for the purpose described.

2. The combination of yokes D, plates E, and slotted side teeth of rake, as and for the purpose described.

JOHN RUMRILL.

Witnesses:
E. L. NORTON,
F. W. NORTON.